United States Patent

Lafuze

[11] 3,908,130
[45] Sept. 23, 1975

[54] STARTER-GENERATOR UTILIZING PHASE CONTROLLED RECTIFIERS TO DRIVE A DYNAMOELECTRIC MACHINE AS A BRUSHLESS MOTOR IN THE STARTING MODE TO INCREASE THE TORQUE OUTPUT OF THE MACHINE THROUGH PHASE ANGLE CONTROL BY REDUCING THE MACHINE COUNTER EMF

[75] Inventor: David Logan Lafuze, Erie, Pa.

[73] Assignee: General Electric Company, Wilmington, Mass.

[22] Filed: Aug. 30, 1974

[21] Appl. No.: 502,026

[52] U.S. Cl. .................. 290/46; 318/227; 290/38; 290/31; 318/254; 318/430
[51] Int. Cl.² ........................................ H02K 23/52
[58] Field of Search ............ 290/46, 31, 10, 19, 22, 290/37, 38; 318/227, 254, 432, 434, 430; 60/39.14

[56] References Cited
UNITED STATES PATENTS

| | | | |
|---|---|---|---|
| 3,264,482 | 8/1966 | Clark et al. | 290/52 |
| 3,591,844 | 7/1971 | Schonebeck | 290/31 |
| 3,684,935 | 8/1972 | Sawyer | 318/227 |

Primary Examiner—G. R. Simmons

[57] ABSTRACT

The instant invention is an improvement of a starter-generator arrangement in which a dynamoelectric machine is driven as a brushless DC motor to start a dynamic load such as a jet engine and as a synchronous constant frequency generator after the jet engine is ignited and brought up to speed. A plurality of cycloconverters utilizing phase controlled rectifier banks are operated from a constant frequency supply source to supply current to the armature windings of the machine in the starting mode. Position sensing elements such as Hall generators sense the rotor position relative to the machine windings and generate enabling signals to control conduction of the phase controlled rectifiers to supply current to the proper armature windings so that the machine functions essentially as a DC brushless motor. The stator current conduction angle with respect to rotor position is varied as a function of speed to vary the phase angle of advance and provide for commutation of the SCR's by the machine voltage at higher speeds. In addition, at machine speeds where the counter EMF generated in the armature windings rises sufficiently to reduce armature current, means are provided for reducing the counter EMF by further advancing the phase angle and providing additional torque to accelerate the engine. Specifically, a control signal proportional to the armature current is utilized to increase the phase angle between the armature current, the flux, and the machine voltage sufficiently to reduce the machine counter EMF thereby increasing the armature current and providing additional accelerating torque over an extended speed range to the jet engine.

4 Claims, 4 Drawing Figures

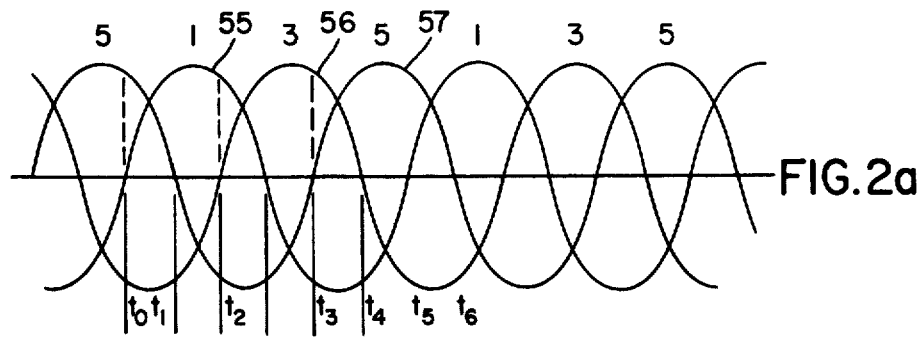
MACHINE WINDINGS COUNTER EMF — FIG.2a
HALL PROBE Ø1 — FIG.2b
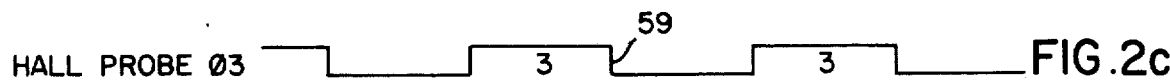
HALL PROBE Ø3 — FIG.2c
HALL PROBE Ø5 — FIG.2d
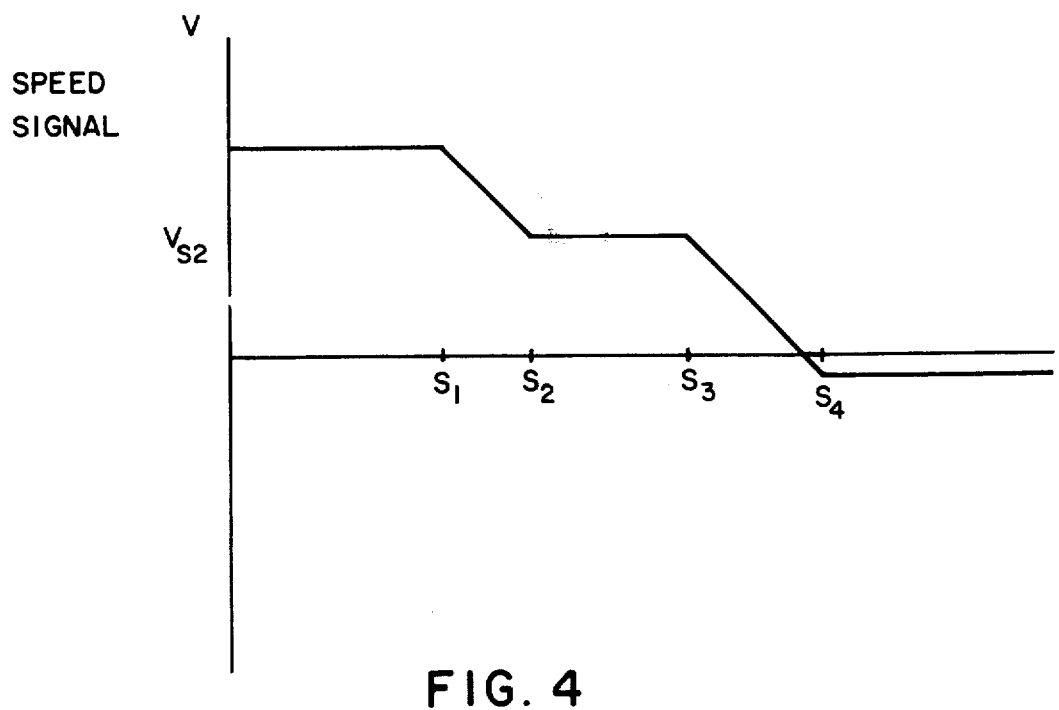
FIG. 4

STARTER-GENERATOR UTILIZING PHASE CONTROLLED RECTIFIERS TO DRIVE A DYNAMOELECTRIC MACHINE AS A BRUSHLESS MOTOR IN THE STARTING MODE TO INCREASE THE TORQUE OUTPUT OF THE MACHINE THROUGH PHASE ANGLE CONTROL BY REDUCING THE MACHINE COUNTER EMF

The instant invention relates to a system for controlling a dynamoelectric machine to operate the machine as a DC brushless motor in one operating mode and as a generator with a constant frequency output in another mode. More particularly, the invention relates to a system in which cycloconverter control circuits are operated in such a manner as to drive the dynamoelectric machine as a brushless motor in one mode and to provide frequency conversion of a variable frequency voltage from the machine during the generating mode. Furthermore, circuitry is provided which adjusts the phase angle between the armature current, the flux, and the machine counter EMF at high speed to reduce the machine counter EMF and increase current to extend the speed range over which the machine positive torque with field weakening.

In an application for U.S. Letters Patent, Ser. No. 502,027 filed Aug. 30, 1974 in the name of David Logan Lafuze entitled, "A Starter-Generator Utilizing Phase Controlled Rectifiers to Drive a Dynamoelectric Machine as a Brushless DC Motor in the Starting Mode with Starter Position Sense Variation with Speed," assigned to the General Electric Company, the assignee of the present application, a starter-generator system is described in which a plurality of cycloconverter SCR banks are provided to supply current to the proper armature windings of a synchronous dynamoelectric machine so that the machine functions essentially as a DC brushless motor. In the starter-generator described in the above identified Lafuze application, Ser. No. 502,027 which, in turn, is an improvement over an application for U.S. Letters Patent Ser. No. 440,322, filed Feb. 7, 1974, also assigned to the General Electric Company assignee of the present application, in the name of David Logan Lafuze and entitled, "Starter Generator Electrical System Utilizing Phase Controlled Rectifiers to Drive a Dynamoelectric Machine as a Brushless DC Motor in the Starter Mode and to Provide Frequency Conversion for a Constant Frequency AC Output in the Generating Mode," field weakening of the main machine is utilized whenever the machine counter EMF rises sufficiently to increase armature current and output torque. Applicant has found that the field weakening circuitry may be eliminated and the same results achieved, namely increasing armature current flow and output torque over an extended speed range by varying the phase angle between the armature current, the flux and the machine voltage to reduce the machine counter EMF.

It is therefore one of the objectives of the instant invention to provide a starter-generator system utilizing a common dynamoelectric machine and common cycloconverter control circuitry for controlling distribution of current to the dynamoelectric machine during motoring in which counter EMF induced in the machine during motoring is controlled to maintain positive torque output from the machine over an extended speed range without utilizing field weakening of the machine.

Yet another objective of the instant invention is to provide a startergenerator system in which a dynamoelectric machine is operated as a brushless DC machine in the motoring mode in which the angle of phase advance of the cycloconverters which control the machine is controlled as a function of armature current level to reduce the machine counter EMF to produce positive torque output over an extended speed range without field weakening.

Other advantages and objectives of the instant invention will become apparent as the description thereof proceeds.

The various advantages of the instant invention are realized by providing a main machine of the synchronous type which is operated as a DC brushless motor in the motoring mode and as a synchronous generator in the generating mode. The main machine, in both modess, is controlled by cycloconverters having a plurality of phase controlled rectifier banks which operate as commutating or switching elements during the motoring mode. In the motoring mode, signals representative of the main machine rotor position are processed in suitable logic circuitry to generate signals which control individual rectifiers in the rectifier bank to switch current to the proper armature windings of the main machine. The main machine rotor position signals are modified as a function of the speed of the machine to minimize position sense advance, i.e., the phase angle between armature current and the flux to allow maximum torque at low speeds and to allow commutation of the SCR's by the machine voltage at higher speeds. In addition, at speeds where the counter EMF induced in the machine windings would normally be sufficiently high to reduce armature current and reduce the torque from the machine, a control signal representative of current level is utilized to provide further phase advance of the SCR's, thereby further increasing the phase angle between the armature current and the flux. This additional increase of the phase angle reduces the counter EMF and allows the supply voltage to drive armature current through the windings thereby maintaining positive torque output for the machine. In this fashion, the machine is permitted to function as a motor over an extended range without requiring field weakening of the main machine.

The novel features which are believed to be characteristic of this invention are set forth with particularity in the appended claims. The invention itself, however, both as to its organization and mode of operation, together with further objectives and advantages, may best be understood by reference to the following description taken in connection with the accompanying drawings in which:

FIG. 1 is a block diagram of the overall starter-generator system utilizing a single dynamoelectric machine both as a motor and a generator and shows the control circuitry for achieving the switching of current to the proper windings during motoring, circuitry for controlling current levels during motoring and circuitry for converting the output from the machine to a constant output frequency during generating.

FIG. 2 shows the voltages generated in the machine when functioning as a motor and the phase relationship of this voltage, the position sensor and the position sensor output.

FIG. 4 is a wave form diagram showing the output signal responsive to current level applied to the logic circuitry to reduce the counter EMF.

Figure 1:
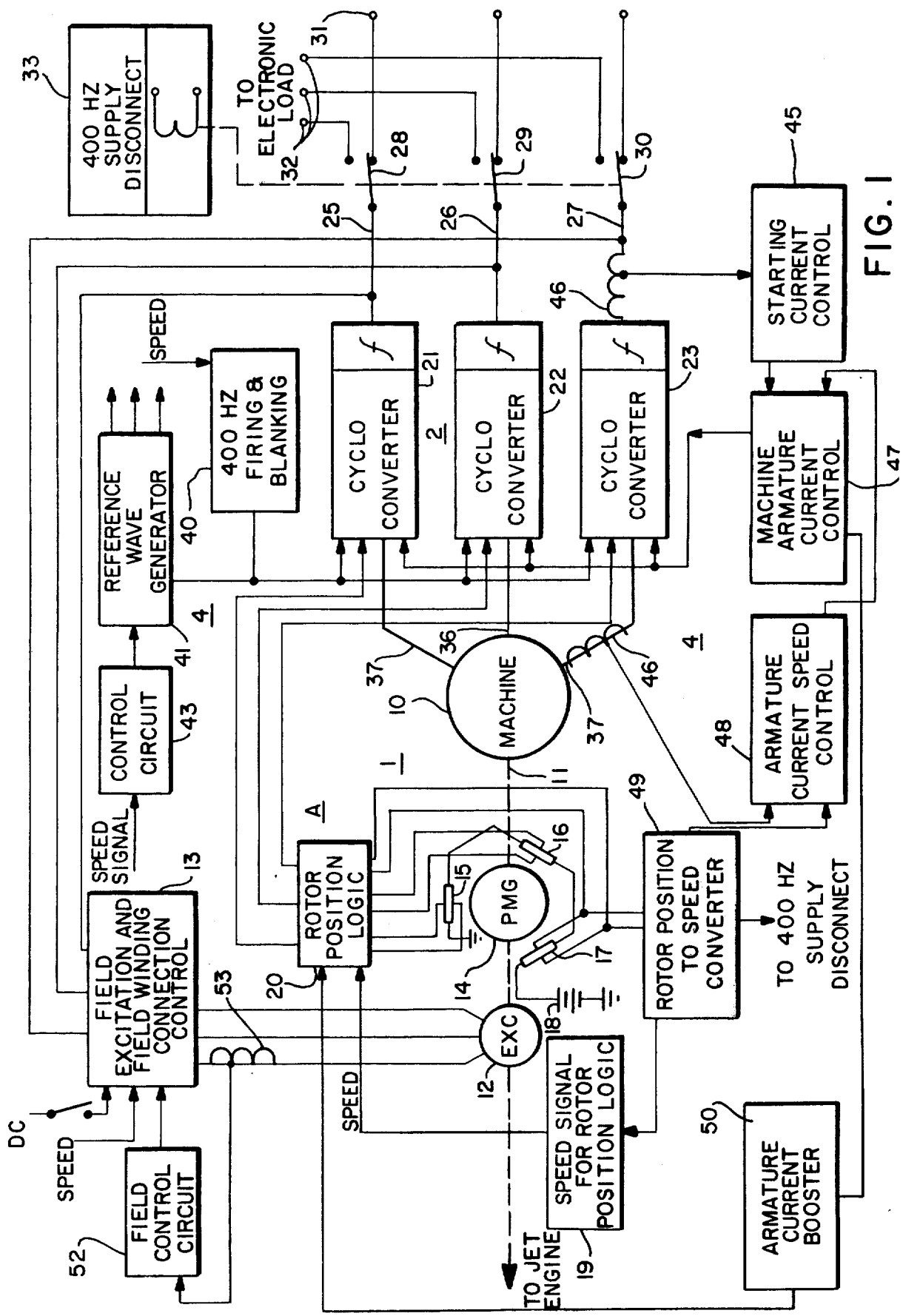

FIG. 1 is a block diagram of the overall system in which a dynamoelectric machine is utilized both as a DC brushless motor to start a dynamic load such as a jet engine and as a synchronous generator driven by the jet engine after it has ignited and been brought up to speed. The system consists of four major subsystems. The first is the main power chain shown generally at 1 which includes the dynamoelectric machine and its associated energizing elements. The cycloconverters including the phase controlled rectifier banks which selectively switch current flow to the proper windings of the main machine during the motoring mode and convert the variable frequency output from the generator to the constant frequency output generating mode are shown at 2. A current control system shown generally at 3 is provided to control the current level in the machine during motoring operation and senses both input current and machine current to control the firing angle of the rectifiers in the cycloconverters and hence the armature current levels during the motoring mode, the machine counter EMF so that the machine remains in the motoring mode and continues to produce positive torque. The fourth major subsystem includes the control circuits for firing the cycloconverter rectifiers in the proper sequence to switch current at the proper armature windings as a function of rotor position as well as the means to vary the phase angle as a function of machine speed. In addition, the phase angle is varied as a function of current lever to reduce the machine counter EMF so that the machine continues to function as a motor and produce positive torque.

The main power chain consists of a main machine 10 mounted on a shaft 11 and is preferably a synchronous machine having DC field windings mounted on the rotor and a six phase armature mounted on the stator. Mounted on the same shaft as the main machine 10 is an exciter generator 12 which has armature windings on the rotor and field windings on the stator. The exciter field windings are the only elements which are modified in switching between the motoring and the generating modes. The exciter field is connected in a three phase WYE connection and energized from an AC source through a field excitation and field winding connection control circuit 13 during the motoring mode and is connected in series and excited from a DC source to function as an inside-out synchronous generator during the generating mode.

The manner in which the exciter field windings are modified in switching between the motoring and generating modes is described and claimed in a contemporaneously filed application for U.S. Letters Patent entitled: A Field Excitation System for Synchronous Machines Utilizing a Rotating Transformer/Brushless Exciter Generator Combination Ser. No. 440,516, filed: Feb. 7, 1974 in the name of Lawrence Waters Messenger and assigned to the General Electric Company, the assignee of the present application.

The voltages induced in the rotor winding of exciter 12 are rectified in a rectifier bridge, not shown, mounted on or within shaft 11 to provide DC excitation for the main machine. Also mounted on shaft 11 is a permanent magnet generator (PMG) 14 having a rotor consisting of a plurality of permanent magnet pole pairs and an armature winding mounted on the stator. The PMG provides the DC field excitation for exciter 12 during the generating mode and provides a means for determining the rotor position of the main machine during the motoring mode with the rotor position being utilized to control switching of current to the armature windings by the cycloconverter system 2. To this end, three Hall generators 15, 16 and 17 mounted in the air gap of the PMG are spaced 120 electrical degrees apart with respect to the permanent magnet pole pairs and in magnetic flux sensing relationship to the rotor permanent magnets. The Hall generators are energized by applying a voltage from a DC source 18 across one pair of faces of the Hall material. A voltage is generated across the Hall element which is proportional to the magnetic flux density applied to the Hall element. Thus, as rotor of PMG 14 rotates, the voltage across the respective Hall generators varies from 0 to a maximum as a function of the flux density thereby generating three varying trapezoidal voltages spaced 120 electrical degrees apart. The output from the Hall sensors are thus representative of the position of the PMG rotor. If the rotor of the PMG is constructed to have the same number of pole pairs as the main machine and the poles on the PMG are aligned with the poles of the main machine, the main machine rotor position is known if the PMG rotor position is known. Thus, the output signals from the Hall elements 15–17 may be used to control switching of the gated elements in the cycloconverters to switch current to the proper winding in the armature of the main machine.

To this end, the three output signals from the Hall sensors are applied to a Rotor Position Logic network shown generally at 20 which converts the varying Hall voltages to six enabling signals of 120° duration to control the conduction interval of the six rectifiers in each bank. These rotor position logic signals are applied over suitable leads to the individual cycloconverters forming part of the cycloconverter assembly 2.

The Rotor Position Logic network is also controlled in response to a signal proportional to the speed of the machine to vary the conduction period with respect to rotor position as a function of speed. The duration of the enabling signals for the SCR's which are produced by the Rotor Position Logic network 20 is varied as a function of machine speed. Thus, over a critical range of machine speeds (preferably at speeds where the machine frequency varies from half the supply frequency to the supply frequency, i.e., the range where commutation of the SCR's is transferred from commutation by the supply voltage to commutation by the machine voltage counter EMF), the rotor position sense is varied to permit proper commutation of the armature current by the machine voltage. To this end, the output voltages from Hall probes 14–16 are processed in a Rotor Position to Speed Converter network 49 to produce a signal proportional to speed. That is, by differentiating the rotor position signals from the Hall probes, a signal proportional to rotor speed is produced and is applied to a Speed Signal for Rotor Position Logic Network 19. Network 19, may, for example, include circuitry for producing a variable width pulse which is proportional to speed. The output from network 19 is applied to Rotor Position Logic Network 20 to vary the duration of the enabling signal and thereby control the phase angle between armature current, flux and machine voltage. It will be apparent to those skilled in the art that the invention is not limited to an arrangement in which a variable width pulse is provided as the speed signal for the Rotor Position Logic Network. Any suitable DC signal which is proportional to speed may be utilized. In fact, the output from Network 49 may be applied directly to Rotor Position Logic Network 20 and Network 19 eliminated completely.

Rotor Position Logic Network 20 receives a further input signal from Armature Current Booster Circuit 50 to reduce the machine counter EMF so that the machine continues to produce positive torque at speeds where the machine would normally not do so. That is, the machine eventually reaches a speed which is still less than the jet engine idling speed where the counter EMF approaches is equal to or becomes greater than the supply voltage. Consequently, the supply voltage can no longer force enough current through the armature windings to satisfy the control loop requirements. In other words, as the counter EMF approaches the supply voltage the armature current and hence, the accelerating torque is reduced until there is not sufficient torque to accelerate the engine further. When the armature current drops, the signal from Machine Armature Current Control Circuit 47 which is applied to Armature Current Booster Circuit 50, results in a control signal from Booster Circuit 50 which is applied to Rotor Position Logic Network 20 to vary the amount of phase advance. This, in turn, varies the phase angle between the armature current, the flux, and the machine voltage to reduce machine counter EMF and increase the armature current so that the machine produces sufficient torque to continue to accelerate the engine.

Cycloconverter assembly 2 consists of three cycloconverters 21, 22 and 23 along with the associated output filters which are connected through leads 25, 26 and 27 and a speed controlled switch, shown for the sake of simplicity as three single pole double throw switches 28, 29 and 30, alternatively to a source of 400 Hz supply voltage at the terminals 31 or to an electrical output load connected to the terminals 32. The single pole double switches are controlled by a Supply Disconnect Network 33 which positions the single pole double throw switches to connect the cycloconverters to the source 400 Hz supply voltage when the system is in the start mode. When the main machine 10 has brought the jet engine up to idling speed, Supply Disconnect Network 33 repositions the single pole double throw switces to disconnect the constant frequency supply source from the converters and to couple the output of the cycloconverters to the electrical load which receives the constant frequency output signal during the generating mode.

Each cycloconverter 21–23 consists of two banks of oppositely poled silicon controlled rectifiers (SCR's) which are selectively gated to control their conduction interval. Each bank consists of six rectifiers, one SCR for each of windings of the six phase armature. Oppositely poled rectifier banks are provided for each supply phase to allow flow of current into and out of the respective windings, i.e., negative and positive current, during the motoring mode and to provide current rectification and inverting mode of the machine when operating in a generating mode.

One input to the cycloconverters is from the main machine armature windings over leads 35–37. This input is shown as a three-phase lead from the machine. In actuality, for a six phase machine, each of the outputs is a pair of windings from the corresponding pair of armature windings in the machine since the voltages in complementary pairs of windings of a six phase machine are 180° out of phase. Thus, phase 1 and phase 4 of a six phase machine are 180° out of phase so that at any given point in time the corresponding rectifiers in a positive and negative bank of the converter will be conducting at the same time to permit current flow into one winding of the pair and out of the other winding of the same pair.

The cycloconverters are also supplied with the output from the Rotor Position Logic Network to determine which of the SCR's in any given bank is to be fired and which of the armature windings is to be supplied with the current. Simultaneously, each of the cycloconverters is supplied with a firing and blanking wave from the firing and blanking wave circuit 40 to ensure that firing or triggering pulses are supplied to the SCR's at any given bank only when the polarity of voltage across that SCR in a given bank is proper. To this end, firing and blanking wave network 40 is supplied by the 400 Hz supply voltage and generates suitable blanking waves for each of the cycloconverters depending on the phase of the supply voltage. Firing and blanking network 40 is operative to provide the firing and blanking signals only during the the motoring mode of the machine. Whenever the system switches to the generating mode, firing and blanking network 40 is disabled in response to a speed control signal impressed on disable terminal. Reference wave generator 41, which is normally disabled by control circuit 43 during the motoring mode is then coupled to the cycloconverters and supplies a reference wave signal. The signal from Reference Wave Generator 42 is compared in the cycloconverter to the integral of the machine line-to-line voltage to produce the triggering pulses for the individual rectifiers which control the conducting intervals so as to produce a constant frequency output from the variable frequency input signal of the main machine. Control circuit 43 which normally disables reference wave generator 41 is controlled by a speed signal so that when the main machine reaches a certain speed, a speed at which the machine converts from the motoring to the generating mode, the firing and blanking waves generating circuit 40 is disabled and the constant frequency reference wave generator 41 is enabled to take over control of the cycloconverters.

The firing sequency of the individual rectifiers in the cycloconverter rectifier banks is also controlled by a fourth signal which varies the firing point and hence, the phase angle of the rectifiers in the banks as a function of the current in the machine during the motoring mode. To this end, the current sensing and control chain illustrated generally at 4 initially regulates the current level as a function of input current from the supply source to the cycloconverters and thereafter, as the starter picks up speed, controls the current level both in response to the machine stator current level and machine speed. As the machine increases in speed thereby increasing counter EMF generated in the stator windings of the main machine, a point is eventually reached at which the counter EMF is sufficiently high so that insufficient armature current flows to continue to provide accelerating torque. At this point, the current control network 4 introduces field weakening, i.e., reduces the magnitude of the field of the main machine thereby reducing the counter EMF increasing armature current. In addition, the current control source also operates to control the field excitation of exciter 12 to maintain the exciter current constant as the speed increases to avoid overheating when the machine is at a standstill and at very low speeds.

When the machine is at a standstill, the current in the machine windings is DC and therefore difficult to measure. At low speeds, the AC machine current is at a very low frequency and consequently also difficult to measure. Hence, machine current control at standstill and low speeds is obtained indirectly by measuring the supply current rather than the machine current. A Starting Current Control Network 45 receives, via current transformer 46, the incoming 400 Hz current from the supply source compares it with a reference current and provides an error signal proportional to any deviation. The error signal applied to a Machine Armature Current Control Network 47 which provides a control voltage that is applied to the cycloconverters to vary the current level of the cycloconverter. Machine Armature Current Control Network 47 is also controlled in response to an Armature Current/Speed Control Network 48 which senses the machine armature current and the speed of the machine to override the effect of Starting Current Control Network 45 whenever the armature current and the machine speed reach a predetermined level. When Starting Current Control Network 45 is disabled, Machine Armature Current Control Network 47 produces control signals for the cycloconverter solely in response to the machine armature current and machine speed. To this end, machine armature current is sensed by a suitable armature current transformer coupled to one of the main machine output lines and applied as an input to network 48. It will be appreciated that although but a single current transformer is indicated that the signal representative of the armature current may be taken from all of the armature windings to present an average armature current at the regulating element.

The other input to Armature Current Speed Control Network 48 is from Rotor Position to Speed Converter 49 which is coupled to the output of one of the Hall devices associated with the PMG generator. That is, the voltage from the Hall generators represent the position of the PMG rotor. By suitably processing these position signals, as by differentiation, for example, the speed of the rotor may be sensed and the speed signal is utilized to control the armature current level and is also utilized to disable the various logic networks whenever the speed of the machine is sufficiently high to switch operation from the starting to generating mode.

Field control circuit 52 operates to maintain field excitation of exciter 12 constant. One input to field control circuit 52 is from a current transformer 53 coupled to the exciter field winding which senses the current supply to the exciter. Field control circuit 52 maintains field excitation constant by maintaining constant field current for exciter 12. The basis for this form of regulation of the field current is the fact that as the speed of the exciter increases, the effective impedance of the exciter goes down. If a constant voltage is applied to the field winding, the field current goes up with speed increasing the output of the exciter and increasing the excitation applied to the main rotor field. Since the main rotor field is already at saturation, this would simply pump more current into the main machine field resulting in heating of the machine. Consequently, as the speed of the machine goes up and the impedance of the exciter goes down, tending to increase current flow, the current flow in the exciter is sensed and the field control circuit produces a control signal which reduces the excitation to maintain the current constant as the machine increases in speed from standstill to operating speed.

In summary, the starter generator circuit illustrated generally in block diagram in FIG. 1, consists of a main machine which is of synchronous construction, an exciter generator to supply field excitation for the main machine and a permanent magnet generator which supplies DC excitation for the exciter during the generating mode and which is also utilized by position sensing of the main machine rotor. Sensing of the main machine rotor position is achieved by means of suitably positioned Hall generators in the permanent magnet generator, which has the same number of pole pairs as the main machine to produce position sensing voltages which are then converter in suitable logic circuitry to control the rectifiers in cycloconverters 21-23 to switch current to the proper armature windings of the main machine.

In addition, the rotor position logic is modified as a function of speed and machine counter EMF to control the phase angle between armature current, flux and machine voltage to advance the phase angle with speed, to ensure that proper commutation of the SCR's by the machine voltage can take place at speeds where the machine frequency is at least half of the supply frequency or greater. Furthermore, the phase angle between $1a$ and flux is controlled to reduce counter EMF and to maintain torque output at higher speeds. In this fashion, the main machine is operated as a brushless DC motor with the cycloconverter banks operating as commutating or switching means to supply current proper armature windings in response to the rotor position sensed by the Hall devices associated with the PMG's with a phase angle which is controlled by the speed of the machine.

After the machine reaches the idling speed of the jet engine, it is being driven by the engine and must convert from the starting (motoring) to a generating mode. Speed signals are generated which disable the Rotor Position Logic Network that switches current between armature windings as a function of rotor position The constant frequency supply voltage is disconnected from the cycloconverters and the field windings for exciter 12 are reconnected. DC excitation is applied to the exciter to operate it as a synchronous exciter-generator. Reference wave generator 41 is coupled to the cycloconverters so that the cycloconverters now function as frequency converters to convert the varying frequency output from the main machine armature now being driven by the engine, to a constant frequency output signal.

The details of the circuits for producing starting current control, machine armature control, armature current speed control, field weakening, 400 Hz firing and blanking, the details of the cycloconverter connections, and the means of firing the same, are not critical to the instant invention which is concerned with the means for modifying the rotor position logic output as a function of speed to control the phase angle of the armature current flow as a function of speed. The details of these various other circuits are described and shown in the aforementioned Lafuze patent application, Ser. No. 440,322 and reference is hereby made to the said copending application for the details of the circuits and it is hereby incorporated by reference for a showing of the details of these particular circuits making up a part of the overall starter generator.

Figure 3:
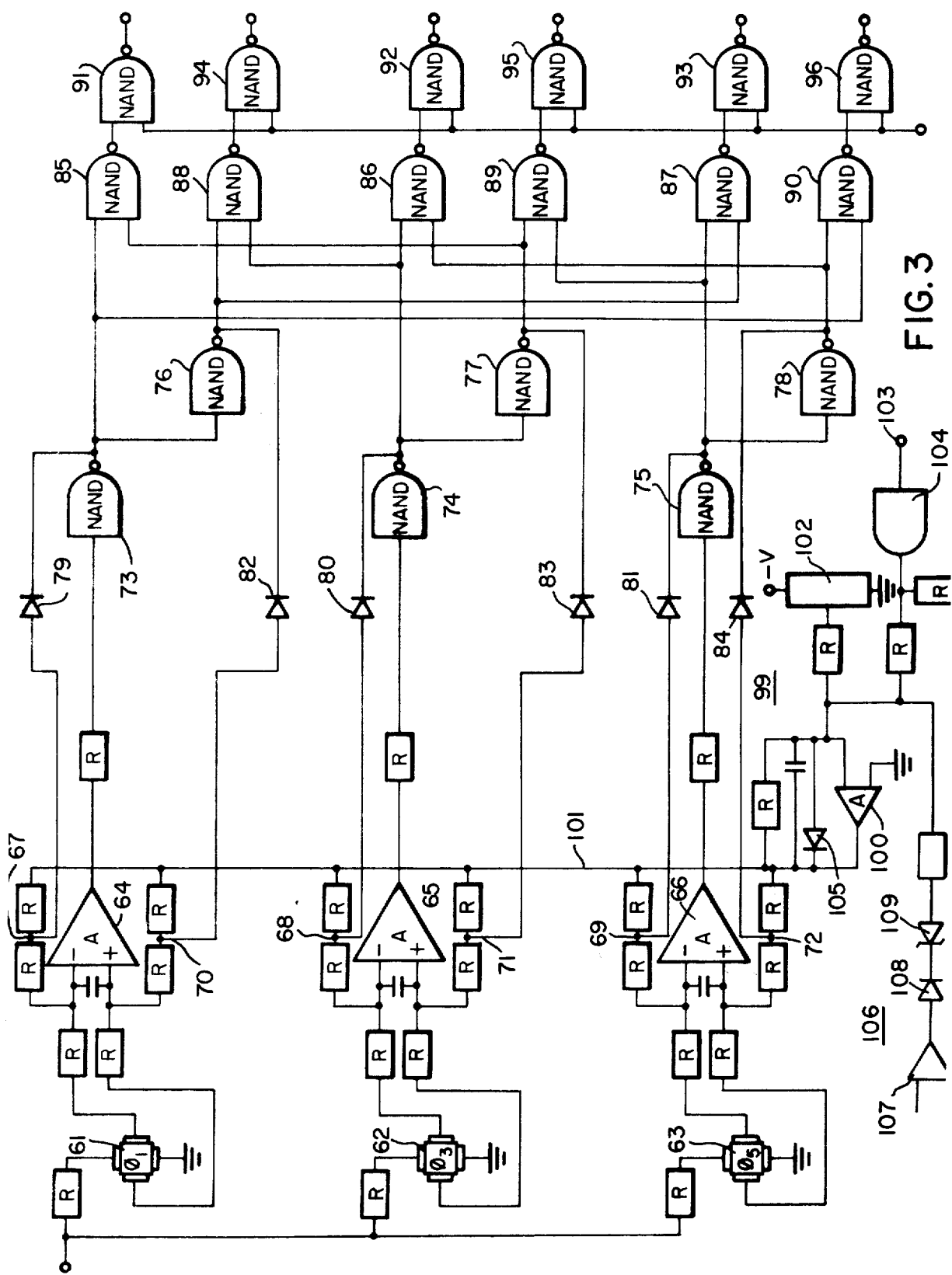
FIG. 3 is a schematic diagram of the circuitry associated with the position sensors to generate the signals which control the firing of the phase controlled rectifiers and the manner in which these signals are modified to reduce the counter EMF of the machine above a predetermined speed.

The Rotor Position Logic Network is shown in FIG. 3 and processes the output signals from the Hall generators to provide enabling signals which control the current flow in the selected windings. By positioning three Hall probes 120 electrical degrees apart, for a six phase machine, it is possible to determine when the flux associated with a given winding approaches a maximum value. From this information, it is possible to generate enabling signals when they allow current to flow into and out of a particular winding to produce torque. In addition, the rotor position logic must ensure that the SCR associated with a given winding is triggered to allow current to flow only when the SCR associated with the next succeeding armature winding is not in condition to be triggered to prevent simultaneous current flow in successive armature winding phases. Furthermore, the Hall probes are so positioned, mechanically, with respect to the armature windings that the Hall probe output leads the actual field flux sufficiently so that the SCR's may be properly commutated. In other words, the armature current must be sufficiently phase advanced with respect to the flux field to permit proper commutation of the SCR's. Consequently, at low speed the phase angle can be very small producing maximum torque since the supply voltage can commutate the SCR's. As the speed increases to a level where the machine frequency exceeds half the supply frequency and commutation must be accomplished by the machine voltage, the armature current phase angle must be advanced. The Rotor Position Logic output must be modified in response to a speed signal to allow variation with speed by phase advancing the armature current sufficiently to permit commutation of the SCR's by the machine voltage and thereafter to reduce the machine counter EMF for the machine to continue to produce positive torque.

With respect to the main enabling signal from the rotor position logic, assume for example, that the firing sequence is to be such that current flows successively into windings, W1, W3 and then W5, (and out of Windings 2, 4 and 6). When the Hall probe indicates that current is to be supplied to winding W3, because the flux from the field is increasing so that the flux at winding W3 becomes high, the logic circuit must generate the enabling signal for the SCR's associated with winding W3 only during the interval when the Hall probes also indicate that the flux at W3 is high and the flux associated with the next succeeding winding, i.e., W5, to which current is to be switched thereafter is low. This is to insure that only one winding at a time receives current.

Hence, with phase sequence 1, 3 and 5, it is obvious that when current flow can be switched to the phase 3 winding W3 only during the interval when the flux associated with the phase 3 winding is high but not if the flux associated with phase 5 is also high. Similarly, when current conduction is to be transferred from the phase 3 winding W3 to the phase 5 winding W5 of the machine, this can take place only when the flux at W5 is high but not while the flux at phase 1 winding W1 is also high. The SCR's associated with the individual windings are thus triggered when the SCR's associated with the next phase windings conduct current are positively disabled. The nature and significance of this relationship can best be understood in connection with the wave form diagrams of FIG. 2, which illustrate the wave form of the counter EMF generated in the phase windings W1, W3 and W5 (i.e., the machine voltages) and the output voltages from the Hall probes. Thus, in FIG. 2a, the counter EMF in the machine windings, W1, W3 and W2, is shown by the wave form 55, 56 and 57. The output of the Hall probe amplifiers associated with phase winding W1, (and hence also with phase 4 which is 180° out of phase with phase 1) is illustrated in FIG. 2b by the wave form 58 whereas the outputs of the Hall probes associated with windings W3 and W5 (and hence W2 and 6) are shown by the wave forms 59 and 60 in FIGS. 2c and 2d. The outputs of the Hall probes have been processed in an operational amplifier or the like to convert the trapezoidal outputs from the Hall probes to square waves 58–60 which are displaced by 120 electrical degrees. The position of the Hall generator is such relative to windings and the counter EMF generated in the windings that the output of the Hall probe is phase advanced sufficiently relative to the counter EMF to permit the conducting SCR to be commutated into the nonconducting state when current is transferred to the next winding. Thus, at $t_0$ assume that current is flowing in phase 5 winding W5 and is to be transferred next to phase winding W1. In order to obtain the maximum torque out of the motor, it would be desirable to allow current conduction into W5 winding until $t_1$ when the voltage reverses and then switch current conduction from the W5 winding to the W1 winding. If this were done, then the angle between the flux, the armature current, and the machine voltage would be 0°, the cosine of the angle is unity thereby producing maximum torque. Stating it another way, it would be desirable to allow the number 5 SCR's to conduct current into winding W5 as long as possible and turn them off at $t_1$ when the machine voltage phase reverses. However, because it may be difficult, if not impossible, to commutate the SCR's at $t_1$, it is necessary to advance the firing of the next SCR, i.e., the No. 1 SCR's to allow sufficient volt seconds to turn off the previously conducting No. 5 SCR's. Consequently, the Hall probes are mechanically positioned so that the Hall voltage goes to a maximum at some time $t_0$ before $t_1$ generating an enabling or firing voltage for the No. 1 SCR's while at the same time, terminating the enabling signal for the No. 5 SCR's. When the No. 1 SCR's are turned on, the conducting No. 5 SCR is then commutated off either by the supply voltage reversing at low speeds or by the machine voltage driving current through it at high speeds. That is, if the No. 1 SCR is triggered into conduction at $t_0$ when the counter EMF winding W5 is still more positive than the counter EMF of winding W1, it has a tendency to drive current through SCR5 in the opposite direction. This internal current loop between the SCR's will tend to turn the No. 5 SCR off before $t_1$ since the counter EMF volt seconds from $t_0$ to $t_1$ of wave form 55 is available to commutate the No. 5 SCR off. It will be understood that his commutation of the SCR's by the machine voltage takes place at speeds where the frequency of the machine voltage is at least half that of the supply voltage or larger. As pointed out previously, at standstill or low speed, the frequency of the supply voltage is so much greater than the frequency of the machine voltage, that there is a phase reversal of the supply voltage every few degrees of the machine voltage and this phase reversal reverses the voltage across the anode and cathode path of the conducting SCR and commutates the SCR off without need for commutation of the SCR by driving current through the SCR in the manner described above. However, as the machine speed and the machine frequency increases, the supply signal can no longer be relied on to commutate the SCR's off and the machine voltage must be utilized to provide the commutation of the SCR's. Consequently, as will be described in detail below, the Rotor Position Logic Network is so constituted that at standstill and speeds up to those at which the machine frequency is one-half the supply frequency, the phase advance is minimal since the supply voltage is being relied on for commutating the SCR. As the speed exceeds the speed at which the machine voltage frequency equals or is greater than one-half of the supply frequency, the speed signal modifies the rotor position logic enabling signals so that the enabling signals are phase shifted to increase the phase angle to allow commutation of the armature current by the machine voltage with increasing speed.

In addition, a further network is incorporated further includes further means for modifying the enabling voltage in response to a signal proportional to armature current. When the armature current drops below a predetermined value, at the speed where the counter EMF has risen sufficiently, a control signal is provided which further shifts the phase of the SCR enabling voltages and varies the armature flux phase angle to reduce the machine counter EMF.

It can also be seen from voltages 58–60 that enabling voltage for the No. 1 SCR's in the various banks produced in the rotor position logic cannot be coextensive with the enabling voltages for the No. 3 SCR's. That is, the field flux at succeeding windings and the Hall output voltages overlap so that time $t_2$ the phase 3 Hall probe voltage goes positive and the enabling signal for the No. 3 SCR's in the various banks is generated. It is therefore necessary to terminate the enabling voltage for the No. 1 SCR's at the time the No. 3 SCR's are enabled for otherwise, it would not be possible to turn off the No. 1 SCR's and turn the No. 3 SCR's on. Hence, when the SCR's associated with a given phase winding are enabled to allow current transfer to that winding from the previous winding in the sequence, this can take place only if the SCR's associated with the succeeding winding to which current is to be transferred are disabled. Otherwise, miscommutation takes place. The following Truth Table indicates the relationships and establishes the intervals during which enabling voltages for the SCR's may be generated to proper switching of current between the windings.

| Hall Probe Condition | Negative Bank SCR Which May be Fired | Positive Bank SCR Which May be Fired |
|---|---|---|
| 1 (High) . $\bar{3}$ (Low) | 1N | 4P |
| $\bar{1}$ (Low) . 3 (High) | 4N | 1P |
| 3 (High) . $\bar{5}$ (Low) | 3N | 6P |
| $\bar{3}$ (Low) . 5 (High) | 6N | 3P |
| 5 (High) . $\bar{1}$ (Low) | 5N | 2P |
| $\bar{5}$ (Low) . 1 (High) | 2N | 5P |

FIG. 3 illustrates one form of the Rotor Position Logic Network which generates the enabling voltages for the various SCR combinations to permit current flow into and out of the armature windings in the proper sequency when the flux is maximum in the positive and negative directions with respect to those windings. Also incorporated in the logic network is a means for modifying the enabling voltages in response to a signal proportional to machine speed to shift the phase of the enabling voltages and to vary the phase angle to permit commutation of the SCR's by the machine voltage over a critical speed range where the machine frequency is equal to or greater than one-half of the supply voltage frequency.

The three Hall devices $\theta_1$, $\theta_2$ and $\theta_3$ which sense the PMG field and hence the corresponding main machine rotor field, are illustrated schematically at 61, 62 and 63. The Hall probes are positioned 120 electrical degrees apart and consist of slabs of Hall material which has an energizing voltage from a source of positive potential $+V$ applied across one pair of faces of the Hall material. A Hall voltage is generated across the orthogonal faces in response to flux applied to the device. The Hall devices, as pointed out previously, are mechanically positioned so that the output of the Hall probe is advanced relative to the machine counter EMF and flux by an angular amount sufficient to permit commutation of the SCR's by the machine voltage and also to permit sufficient additional advance to reduce counter EMF. The Hall voltages which are generally trapezoidal in shape are fed in phase opposition to the inverting and non-inverting input terminals shown respectively by the minue (−) and plus (+) of a plurality of operational amplifiers 64, 65 and 66 which drive a series of digital gates shown generally at 67, presently to be described which generate the enabling voltages for the SCR's.

The operational amplifiers have a very high gain so that they saturate at a very low threshold voltage. When the voltage associated with the inverting terminal of each operational amplifier is positive and exceeds the threshold voltage the output of the operational amplifier goes negative. Correspondingly, when the Hall voltage reverses and the input to the non-inverting terminal becomes positive and exceeds the threshold voltage, the output of the operational amplifier switches and becomes positive. As a result, a square wave is generated from the Hall voltages at the outputs of the amplifiers. Feedback paths 67–69 are provided to the inverting inputs and feedback paths 70–72 are provided to the non-inverting inputs of each of the operational amplifiers. A control signal proportional to the machine speed and armature current from network 99, presently to be described in detail, is coupled to the individual positive feedback paths of the operational amplifier and cause the operational amplifiers to switch with a hysteresis or delay proportional to the feedback signal. Therefore, the speed related signal and the armature current related signal from network 99 delays or advances the switching of the operational amplifiers as a function of machine speed and armature current, thereby shifting the phase of the enabling signals generated by the digital network and varying the phase angle at which commutation and reduction of counter EMF are initiated.

The square wave output voltages from the operational amplifiers are, 180° out of phase with the Hall voltages and are therefore applied to a series of inverting NAND gates 73-75 to invert the square waves and produce square waves which are in phase with the individual Hall voltages from the sensor 61-63. The output from the gates 73-75 are also applied as inputs to a set of NAND gates 76-78 which invert the voltages again so that the outputs of gates 73-75 and 76-78 are respectively in phase and out of phase with the Hall voltages from sensors 61-63.

Coupled between the outputs of NAND gates 73-75 and 76-78 and the positive feedback paths of the operational amplifiers, are a first set of switching diodes 79-81 coupled between the output of gates 73-75 and the feedback paths 67-69 associated with the inverting inputs of the amplifiers and a second set of switching diodes 82-84 coupled between the outputs of NAND gates 76-78 and the feedback paths 70-72 associated with the non-inverting terminals of the operational amplifiers. The individual diodes are controlled by the outputs of the NAND gates which in turn, are controlled by the output of the operational amplifiers to apply the speed control voltage selectively to the inverting and non-inverting inputs. Thus, if the input to the inverting terminal of amplifier 64 is positive, its output is negative and the output of NAND gate 73 is at a high or logic 1 level. This reverse biases diode 79 permitting the speed signal and the armature current from network 99 to be applied unhibited to the amplifier inverting input thereby adding the speed signal to the Hall voltage from sensor 61. Diode 82, on the other hand, is forward biased since the output of NAND gate 76 is at a low or logic 0 level thereby clamping the junction of feedback network 70 associated with the non-inverting terminal of operational amplifier 64 to ground and virtually no speed signal goes to the non-inverting input of operational amplifier 64. In a similar manner the other diodes 80-81 and 83-84 associated with the other NAND gates control the speed signal input to operational amplifiers 65 and 66. Conversely, if the ouptut of the operational amplifier 64 is positive, NAND gate 73 is at the low or logic 0 level whereas NAND gate 76 is at the high or logic 1 level. Diode 79 is, therefore, forward biased clamping the junction of the resistors of feedback network 67 to ground and inhibiting passage of any of the speed signals to the inverting terminal. Diode 82, on the other hand, is reverse biased and almost all the speed and armature current signal goes unhibited into the amplifiers non-inverting terminal to control switching of the amplifiers, a function both of the Hall voltage and the speed and current signals, it is, therefore, seen that the switching diodes 79-84 control the application of the speed signals to the non-inverting and inverting terminals of the operational amplifiers to add these voltages to the Hall voltages and thereby control the conduction switching period of the operational amplifier. As will be pointed out in detail subsequently, the enabling signal is shifted in phase, varying the phase angle as a function of speed.

The outputs from NAND gates 73-75 and 76-78 are applied to a plurality of further NAND gates which combine the signals in such a manner that enabling signals are generated only if the conditions set forth in the above mentioned Truth Table are present. That is, enabling signals are generated for the SCR's associated with a given winding to permit transfer of current to that winding to permit transfer of current to that winding, only if the flux associated with that winding is high but the flux associated with the winding to which current is to be transferred thereafter is low. Thus, the outputs from NAND gates 73-75 which are in phase with the output wave form from the Hall sensors and thus represent the flux states at the W1, W3 and W5 windings are applied to a series of NAND gates 85-87 whereas the output from NAND gates 76-78 which are 180° out of phase with the Hall voltages are applied to a second set of NAND gates 88-90. The other inputs to NAND gates 85, 86 and 87 are respectively from NAND gate 77, NAND gate 78 and NAND gate 76 which represent the inverse of ($\overline{3}, \overline{5}, \overline{1}$) sensors respectively, phase 3, phase 5 and phase 1. The outputs from NAND gates 85-87 are negative when both inputs are positive; for NAND gate 85 when the flux is high at winding 1 but low at winding 3 ($1.\overline{3}$ permitting current transfer from winding 5 to winding 1) for NAND gate 86 when flux is high at winding 3 and low at winding 5 ($3.\overline{5}$) permitting current transfer from winding 1 to winding 3); and for NAND gate 87 when flux is high at winding 5 and low at winding 1 ($5.\overline{1}$) permitting current transfer from winding 3 to winding 1. The outputs of NAND gates 88-90, on the other hand, go negative for the flux condition, $3.\overline{1}$, $5.\overline{3}$ and $1.\overline{5}$ respectively.

The outputs from NAND gates 85-90 are applied as one input to NAND gates 91-96 with the other input being from a start mode gating signal input terminal 97 which applies a positive voltage to the other input terminals whenever the system is enabled. NAND gates 91 through 96 produce positive output enabling signals for their associated SCR's whenever the associated NAND gates 85 etc. goes negative. Thus, the output of NAND gate 91 when NAND gate 85 is negative, i.e., when the flux is high at armature winding 1 but not armature winding W3 (i.e., $1.\overline{3}$), thus permitting transfer of current from phase winding 5 to phase winding 1. NAND gate 92 is positive when NAND gate 88 is negative, i.e., the flux is high at winding W3, but not winding W1 (i.e., $3.\overline{1}$). The outputs of NAND gates 91 and 92 may therefore be used to trigger the No. 4 SCR in the positive bank (4P) i.e., the bank which permits current flow out of the machine to permit current flow out of the phase 4 winding (which is complementary to the phase 1 winding) and the No. 1 SCR's (1N) in negative banks, to permit current flow into the phase 1 winding of the machine. NAND gate 92 enables the No. 1 SCR's in the positive bank (1P) and the No. 4 SCR's in the negative bank (4N) to permit reversal of current flow in this pair of windings. NAND gates 93 and 94 are respectively positive when the flux is high at winding W3 but not winding W5 (i.e., $3.\overline{5}$) permitting transfer of current from winding 1 to winding 3 and high at winding W5 but not at winding W3 ($5.\overline{3}$). The outputs of NAND gates 93 and 94 thus respectively trigger the No. 3 SCR in the negative bank and the No. 6 SCR in the positive bank in the case of NAND gate 93 and the No. 3 SCR in the positive bank and the No. 6 SCR in the negative bank in the case of NAND gate 94. Thus, when the flux is high at winding W5 but not winding W1 (i.e., 5.1̄) NAND gate 95 is positive permitting transfer of current from winding 3 to winding 5 when the flux is high at winding W1 but not winding W5 (1.5̄) the output from NAND gate 96 goes positive. The outputs of these two NAND gates enable the No. 2 SCR's in the positive banks and the No. 5 SCR's in the negative banks in the case of NAND gate 95 and the No. 2 SCR's in the negative banks and the No. 5 SCR's in the positive banks in the case of NAND gate 96.

We have seen from the foregoing that the rotor position logic network selectively enables the individual SCR's in the various banks to transfer to current to a given winding whenever the Hall probe voltages indicate the flux at that particular winding is high and also that the flux density at the next succeeding is low.

The enabling signals to the various SCR's are applied simultaneously to all of the SCR's associated with that winding. The particular SCR that is fired to supply current into or out of the winding is controlled not only by the SCR enabling voltage, but also by the phase enabling voltage. The manner in which a phase enabling voltage illustrated in block diagram form at 40 in FIG. 1 is described in detail in the copending Lafuze application, Ser. No. 440,322 incorporated by reference herein. For example, if the output of one of the NAND gates from the rotor position logic network indicates that the No. 1 SCR in the positive bank and the No. 4 SCR in the negative bank is to be fired, all of the No. 1 SCR's in all of the positive banks (which equal the number of machine phases) are enabled as well as all the No. 4 SCR's in the negative banks. However, only one No. 1 SCR in the positive bank and one No. 4 SCR in the negative bank is triggered since only one supply voltage phase is positive with respect to the other phases to allow firing of the No. 4 negative SCR and only one supply voltage is negative with respect to the other phases to allow firing of the No. 1 positive SCR. Thus, current flow into and out of the armature windings are controlled by the phase enabling signals and the rotor position signals which control the particular armature winding to which current is to be supplied at a given time.

The machine speed signal generating network 99 includes an integrating amplifier 100 having an output coupled over lead 101 to the feedback networks 67–72 associated with the operational amplifiers 64–66. Coupled to the inverting input terminal of integrating amplifier 100 is a negative reference signal from a reference potentiometer 102 which maintains the output of integrating amplifier at a high positive value at low speeds. The reference potential from potentiometer 102 is sufficiently negative to drive integrating amplifier into saturation and produce a highly positive output voltage from the amplifier. Also coupled to the input voltage from the amplifier. Also coupled to the inverting terminal of the integrating amplifier is a signal proportional to machine speed. A signal proportional to speed from speed signal generating network 19 is coupled to input terminal 103 and gate 104. The output of AND gate 103 is a variable width positive pulse, the duration of which is proportional to the speed of the machine. Since the positive pulse is applied to an integrating amplifier, the voltage at the inverting terminal due to the speed responsive signal from AND gate 104 has an integrated positive value proportional to the width of the incoming pulse. At low speeds and up to a predetermined speed, i.e., the speed at which the machine frequency equals one-half of the supply frequency, the negative voltage from reference potentiometer 102 is sufficiently large to override the effect of the positive speed voltage from AND gate 104 so that integrating amplifier 100 remains in positive saturation and the output from the amplifier as applied to the operational amplifiers remains at a maximum positive voltage. As the machine speed goes above the predetermined speed the speed signal becomes increasingly more positive and reduces the negative voltage at the inverting terminal of the amplifier sufficiently so that the output of the inverting amplifier becomes less positive with increasing speed. When the machine reaches a speed at which the machine frequency equals the supply frequency the input voltage from AND gate 103 is sufficiently large to reduce the output of amplifier 100 to a predetermined lower but still positive value.

Also coupled to the inverting input terminal of amplifier 100 is an armature current enhancing network shown generally at 106 which applies a signal proportional to armature current to integrating amplifier 100 whenever the armature current drops below a predetermined value when the machine counter EMF is too high. Network 106 includes an operational amplifier 107 and a blocking diode 108 and a zener diode 108 connected in series with amplifier 106 and the inverting terminal of amplifier 100. Operational amplifier 107 normally receives an input signal from Machine Armature Current Control Network 47 and Armature Current Booster Circuit 50. The input to the amplifier is an error signal proportional to the difference between the armature current and a reference signal. Up to the speed where the counter EMF is below the predetermined level (i.e., the speed at which field weakening would be initiated in a normal system) the input signal to the amplifier is such that the positive output from the amplifiers is insufficient to break down the zener voltage, and as a result, zener diode 109 does not conduct and no voltage proportional to the armature current is applied to the inverting input of amplifier 100. When the machine speed increases above the critical value, the armature current drops because of the increase in the machine counter EMF. The machine armature current control network 47 increases its output in an attempt to increase the armature current. When the counter EMF of the machine is almost equal to or greater than the supply voltage and the armature current goes below the desired regulated value, the output of operational amplifier 106 goes more positive. The output of operational amplifier 107 is now sufficiently psoitive to overcome the zener voltage and drive zener diode 109 into conduction and applying a positive voltage to the inverting terminal of amplifier 100 which is added to the speed voltage from AND gate 104. As a result, the output of integrating amplifier 100 is reduced further and becomes less positive. The reduced positive voltage is applied to the operational amplifiers over lead 101. The voltage further advances the firing of the SCR's shifting the phase of the enabling voltage and increasing the phase angle between the armature current, the flux and the machine voltage. The current which is in quadrature, is demagnetizing and the in phase current produces torque. As the phase angle between the load current, the flux and machine voltage increases, the quadrature component increases. This results in a decrease in the counter EMF and the supply voltage can drive additional armature current through the windings so that the machine continues to produce torque for accelerating the engine. As the speed increases again tending to cause an increase in machine counter EMF and reducing the armature current further, an increasing positive voltage is applied to the input terminal. This reduces the positive voltage from amplifier 100 further decreasing the phase advance until a maximum phase advance, as determined by the mechanical positioning of the Hall sensors is reached. In this manner, armature current continues to flow and torque to be produced over an extended speed range without requiring any weakening of the machine field.

The voltage variations of the output of integrating amplifier 100 as a function of speed and armature current is illustrated in FIG. 4 which shows speed plotted along the abscissa and the output voltage from amplifier 100 along the ordinate. From standstill to a predetermined speed $S_1$ at which the machine frequency is one-half the supply frequency, the output voltage from integrating amplifier 100 is at a positive maximum value. As the machine speed exceeds $S_1$ the input from AND gate 104 becomes sufficiently positive to reduce the output voltage from the amplifier until at the speed $S_2$, where the machine frequency equals the line frequency, the output from the integrating amplifier goes to a predetermined lower value $V_{s2}$. Over this speed range the machine counter EMF is not sufficiently high to affect the flow or armature current in the windings and the armature current level is maintained at the regulated value. As the speed increases from $S_2$ to $S_3$, the armature current still remains constant in that the normal regulating circuit can maintain the current at this level until the machine speed is sufficiently high at $S_3$ that the armature current drops below the desired regulated value. At this point, the ouptut of operational amplifier 107 becomes sufficiently positive to break down zener diode 109 and a positive voltage from amplifier 107 is applied to the inverting terminal of amplifier 100. This voltage is added to the positive voltage from AND gate 104 and the positive output voltage of amplifier 100 is reduced over the extended speed range $S_3$ to $S_4$. This reduced positive voltage is applied via feedback network 67–72 to the input terminals of operational amplifiers 64–66 where it is added to the voltage from the sensors 61–64. The reduced positive voltage advances switching of the operational amplifiers further as a function of the armature current signal. The Hall sensors are mechanically positioned for maximum position advance at speed $S_4$, i.e., to provide the maximum phase advance both for commutating of the SCR's by the machine voltage as well as for reducing the counter EMF of the machine. Thus, at speed $S_2$, when the output voltage from the integrating amplifier 100 is $V_{s2}$, representing the speed where commutation of the SCR's by the machine is required since the frequency of the machine voltage is equal to the frequency of the supply voltage, the maximum phase advance has not as yet been reached. When the voltages applied to the operational amplifier input terminals are reduced further over the extended speed range $S_3$ and $S_4$, the phase shift of the SCR enabling voltages is increased thereby further increasing the phase angle between armature current, the flux and the machine voltage and reducing the counter EMF over the speed range $S_3$ to $S_4$.

In summary, at standstill and at low speeds, when the positive voltage from speed/armature current network 99 is at a maximum, switching of the operational amplifiers is delayed by a maximum amount. The enabling signals are phase shifted so that the phase angle of advance is minimized and torque is maximized. At these low speeds, the SCR's are commutated by the supply voltage. Thus, torque is maximized at standstill and low speeds where commutation is by the supply voltage. As the machine reaches the predetermined speed $S_1$ where machine frequency is one-half the supply voltage, the positive speed signal is reduced in amplitude and switching delay of the operational amplifier is correspondingly reduced. During this interval, no input signal from the Armature Current Enhancing Network 106 is applied to amplifier 100 since the output of operational ammplifier 107 is not sufficiently positive to break down zener diode 109. The phase shift of the enabling voltages at the output of the rotor position logic is reduced and the phase angle increases so that additional current may be commutated by the machine voltage. At speed $S_2$ where the machine frequency equals the supply frequency, the speed signal goes to a reduced but still positive value $V_{s2}$ and remains there as the speed signal from AND gate 104, in the form of a variable width pulse, does not increase above $S_2$. Thereafter, at speed $S_3$ the output voltage from amplifier 106 in armature current enhancing network 105 becomes sufficiently positive to break down zener diode 109 and a positive voltage is now added to the positive machine speed voltage. This further reduces the output of amplifier 100 thereby advancing the switching of the amplifiers and producing further phase shifting of the SCR enabling voltages and increasing the phase angle between armature current, flux and machine voltage. This reduces the counter EMF and allows sufficient armature current to be driven through the windings to produce accelerating torque for the machine over the speed range $S_3$ and $S_4$. It can be seen therefore, that reduction of the counter EMF of the machine is made possible without field weakening thereby extending the torque producing capabilities of the machine over an extended range without field weakening and by means of phase angle control of the SCR firing through the rotor position logic. At speed $S_4$ the input to amplifier 100 is sufficiently positive so that its output goes negative. The output of amplifier 100 is however clamped by feedback diode 105 at a voltage below ground equal to the diode drop across diode 105.

It can be seen therefore than an arrangement is provided in which the rotor position sense is controlled so that the phase angle between armature current and machine voltage is optimized for various speeds to provide maximum torque at standstill and low speeds when commutation of the SCR's can be readily achieved by means of the supply voltage and that the phase angle is increased as speed increases to allow commutation of the SCR's by the machine voltage even though torque is reduced at these higher speeds. However, by optimizing the phase advance as a function of speed, the overall efficiency of the machine is increased since maximum torque can be obtained from the machine at the low speeds and at standstill.

While a particular embodiment of the invention has been illustrated and described, it will be apparent that various modifications thereof may obviously be made in the various instrumentalities and arrangements de-

What is claimed as new and desired to be secured by Letters Patent of the United States is:

1. In a starter-generator system the combination of:
   a. A dynamoelectric machine for operation both as a brushless DC motor and as a constant frequency AC generator,
   b. Cycloconverter means coupled to said machine for selectively supply current to the machine armature windings during motoring operation and for converting the frequency of the output from the machine to provide a constant frequency output from the machine during generator operation, said cycloconverter means including banks of oppositely poled, phase controlled, gated switching devices,
   c. Means to operate said dynamoelectric machine as a brushless DC motor including:
      1. a source of fixed frequency alternating supply voltage coupled to said banks of switching devices,
      2. means for sensing the rotor position of said dynamoelectric machine and for producing enabling signals for gating selected ones for said switching devices in sequence to permit current flow in selected armature windings as a function of rotor position so that current flow is in the armature winding having high flux associated therewith to produce positive torque,
      3. means responsive to armature current level in said machine for shiftint the phase of the enabling signals to vary the firing angle of the switching devices over a speed range wherein the machine counter EMF is high and reduces armature current to reduce the counter EMF sufficiently to increase the current to allow the machine to produce accelerating torque in said speed range.
   d. A source of constant frequency reference waves,
   e. means for converting the system from the motoring to the generating mode including,
      1. means responsive to the speed of the dynamoelectric machine for disconnecting the supply voltage and the rotor position gating means from the banks of switching devices of said cycloconverters when the machine reaches a speed at which it is to operate as a generator, and means responsive to the speed of the dynamoelectric machine for coupling said source of constant frequency reference waves to said switching devices to convert the machine voltage of varying frequency to a constant frequency output in the generating mode.

2. The starter-generator system according to claim 1 wherein said rotor position gating means includes means for sensing said rotor pole position and for producing a polyphase signal proportional to the pole flux, means for comparing said polyphase signals and means for producing a gating signal when the pole flux adjacent a given armature winding is high but the flux adjacent to the next armature winding phase is low, and means responsive to armature current level for producing a control signal when the armature current drops below a given level at speeds when the counter EMF of the machine is too high and means responsive to said control signal to vary the phase of said gating signal so that the firing angle of said switching devices is advanced thereby advancing the phase angle between the armature current and the flux to reduce the counter MEF of the machine.

3. The starter-generator system according to claim 2 wherein said means for producing a gating signal includes switching amplifier means for converting said polyphase signals to substantially rectangular signals, and means responsive to said armature current for varying the switching point of said amplifiers as a function of the armature current to vary thereby the phases of said enabling signal and hence the triggering angle of said switching devices.

4. The starter-generator system according to claim 1 wherein said means for varying the phase angle of said gating signals includes a speed responsive means for varying the phase over a first range of speed wherein said machine voltage frequency is equal to or greater than one-half of said supply frequency to permit commutation of the switching devices over said first range by the machine voltage, and to vary the phase further over another, greater range of speeds in response to armature current level to advance the phase of said signal further to reduce the counter EMF of the machine over said further speed range to provide continued torque output from said machine over said further speed range.

* * * * *